United States Patent
Wass

[11] 3,860,786
[45] Jan. 14, 1975

[54] CONTROL MECHANISMS
[75] Inventor: Anthony Charles Lammond Wass, Duddington, England
[73] Assignee: British Domestic Appliances Limited, Peterborough, England
[22] Filed: Feb. 28, 1973
[21] Appl. No.: 336,633

[30] Foreign Application Priority Data
　　Mar. 3, 1972　Great Britain................... 10030/72

[52] U.S. Cl................................. 219/279, 62/236
[51] Int. Cl............................................. F27d 11/00
[58] Field of Search .............. 219/279; 62/236, 497; 236/15 A

[56] References Cited
UNITED STATES PATENTS
2,389,014　11/1945　Weber........................... 219/279 X
3,157,390　11/1964　Douglas............................. 219/279
3,284,610　11/1966　Grubb................................ 219/279
3,722,812　3/1973　Ward................................ 236/15 A Primary Examiner—C. L. Albritton
Attorney, Agent, or Firm—Kirschstein, Kirschstein, Ottinger & Frank

[57] ABSTRACT

A control mechanism for controlling the supply of gas and electricity to an apparatus or installation which can utilize either of these sources of energy, for example an absorption refrigerator in which the heat energy can be provided either by an electric heater or a gas burner. A common selector knob is rotatable in one direction to operate electric switches controlling the electric supply and is rotatable in the opposite direction to operate a gas tap which controls the gas supply, thus ensuring that gas and electricity cannot be supplied simultaneously.

11 Claims, 5 Drawing Figures

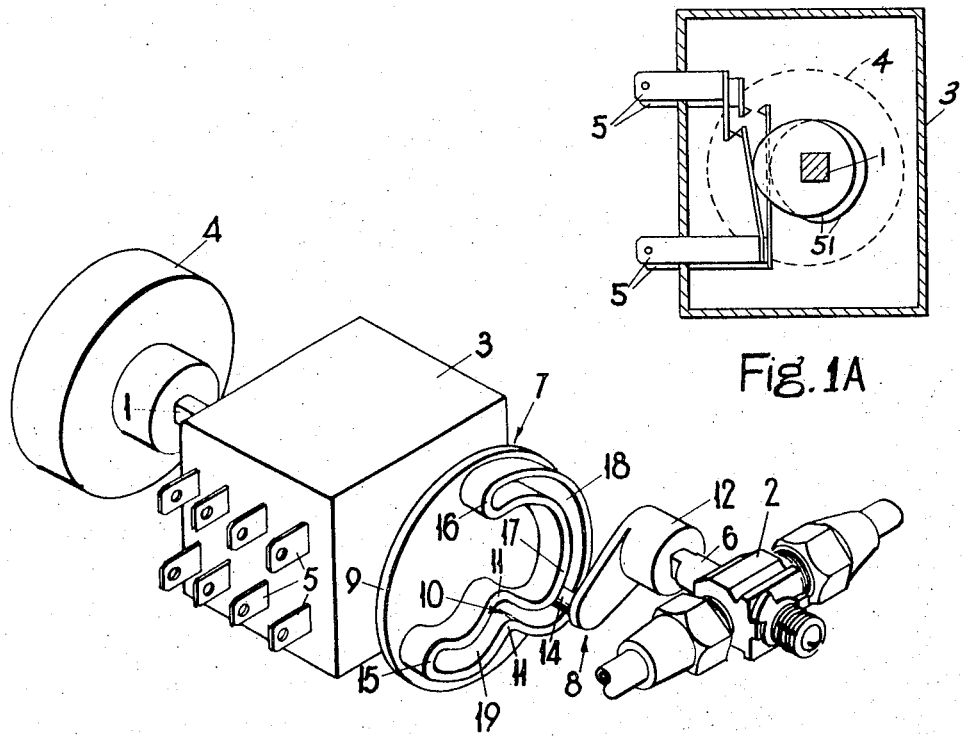
Fig. 1A
Fig. 1
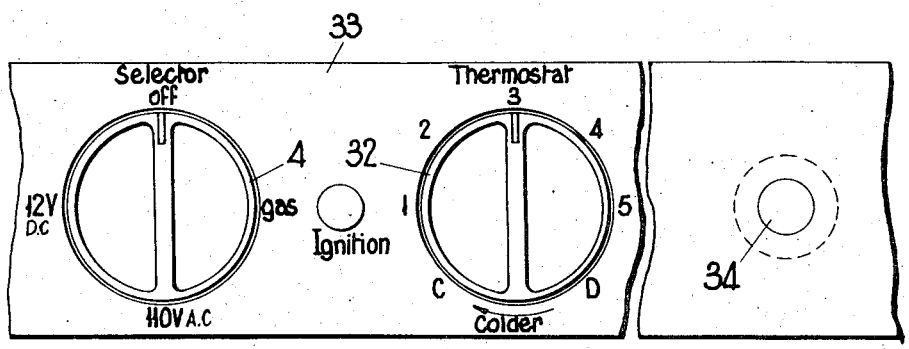
Fig. 3

CONTROL MECHANISMS

This invention relates to a control mechanism for controlling the supply of gas and electricity to an apparatus or installation and has an important application to apparatus such as an absorption refrigerator in which the heat energy required to operate the refrigeration system can be provided by either an electric heater or a gas burner.

According to the present invention a control mechanism comprises a device for controlling a supply of gas and a device for controlling a supply electricity, the devices being operable by a common selector having an "off" position in which neither gas nor electricity is supplied by the devices, and being movable from the "off" position in opposite directions to actuate the respective devices supplying the gas and electricity.

Preferably the common selector is a rotatable member.

The device for controlling the supply of electricity may be formed by switching means coupled to the common selector by cam means.

The device controlling the supply of gas may be formed by valve means coupled to the common selector by a coupling comprising one part provided with a member arranged to ride along an eccentric path provided on another part, to move the valve means between open and closed positions while the device for controlling the supply of electricity is unactuated, and to leave the valve means closed while the device for controlling the supply of electricity is actuated.

The part of the coupling provided with the eccentric path may be secured to the common selector, and the part provided with the member which rides along the path be secured to the valve means.

Alternatively, the part of the coupling provided with the eccentric path may be secured to the valve means, and the part provided with the member which rides along the path be secured to the common selector.

The part secured to the common selector may be provided with an eccentric track approximating in shape to an interrogation mark, and the part secured to the valve means may then have a radially extending arm provided at its outer end with an axially extending member which rides in the track.

The part secured to the valve means may be provided with an eccentric path formed by a radially extending slot, and the part secured to the common selector may then be provided with an axially extending member which rides in the slot.

The valve means may comprise a gas tap of the kind which requires a rotary movement of substantially 90° to turn it from a closed position to a fully open position.

When the control mechanism is incorporated in an absorption refrigerator separate thermostats may be provided for the gas burner and the electric heater and may be coupled together by suitable gearing so that they can be set by a common control knob.

The gas burner of the absorption refrigerator may be supplied with gas by way of a control valve which is held open by an electromagnet energised by an electric current generated when the gas burner is burning. An electric igniter head operated by an ignition button may be arranged to ignite the gas burner. The control valve may be coupled to the ignition button so that it is opened when the ignition button is operated.

The invention will now be described, by way of example, with reference to the accompanying drawings in which:

FIG. 1 is a rear perspective view of a control mechanism in accordance with the invention;

FIG. 1A is a sectional view schematically showing cams of the control mechanism, the same being a section through the electric switch;

FIG. 3 is a fragmentary front elevation of a control panel of the control system shown in FIG. 2.

Figure 2:
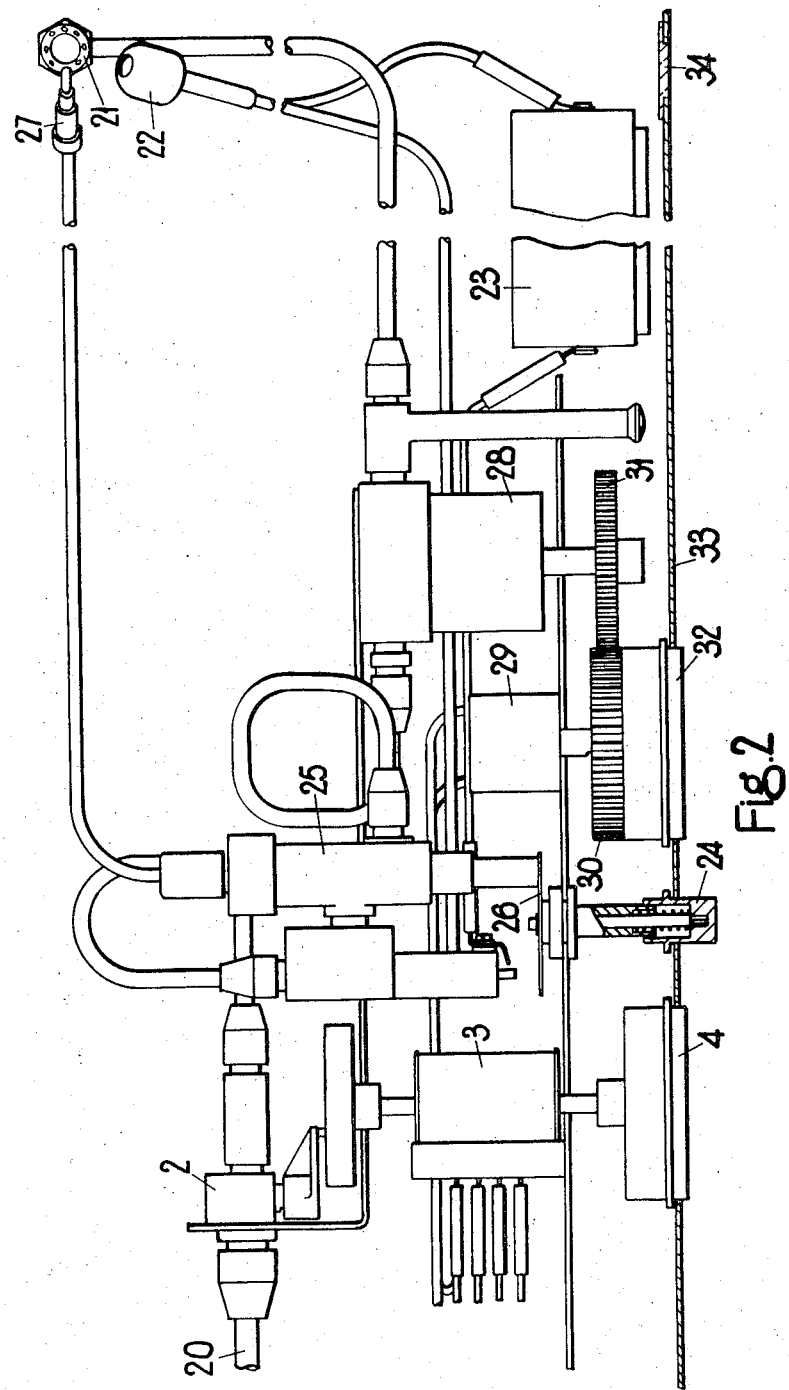
FIG. 2 is a schematic plan view, partly in section, of a control system of an absorption refrigerator incorporating the control mechanism shown in FIG. 1.

Referring in the first instance to FIG. 1, the control mechanism comprises a rotatably mounted shaft 1 which is arranged to operate a tapered plug gas tap 2 and an electric switch 3, when manually rotated by a control knob 4. The electric switch 3 has a plurality of pairs of contacts 5 arranged to be operated by suitable cams 51 on rotation of the shaft 1 by the control knob 4. Typically, when the control mechanism is used in conjunction with an electric heater of an absorption type refrigerator, the pairs of switch contacts 5 can be utilized to selectively energise the electric heater from a mains A.C. supply or from a low voltage D.C. supply such as a car battery. The control knob 4, is suitably calibrated to indicate angular positions of the shaft 1 which correspond to operated and unoperated positions of the pairs of switch contacts 5.

The gas tap 2, which is of a kind requiring a 90° rotation of a plug 6 to turn it from a closed position to a fully open position, is coupled to the shaft 1 by a coupling comprising a circular plate 7 and co-operating arm 8. The circular plate 7 is rotationally fast with the shaft 1 and is provided with an eccentric track 10 which is defined by two parallel upstanding walls 11 and which approximates in shape to an interrogation mark. The arm 8 extends radially from a hollow shaft 12 which is rotationally fast with the plug 6 of the gas tap 2 and carries at its outer end an axially extending cylindrical peg 14 which rides along the track 10. The ends of the track 10 form stop members 15 and 16 which limit the rotational movements of the control knob 4 and the shaft 1, while the configuration of the track 10 governs the rotary movement which is imparted to the plug 6 during rotation of the control knob 4 between the extreme positions determined by the stop members 15 and 16. The control knob 4 is also suitably calibrated to indicate angular positions of the shaft 1 which correspond to the closed and open positions of the gas tap 2, the closed position of the gas tap 2 and the position of the electric switch 3 in which all the pairs of contacts 5 are unoperated being a common "off" position intermediate the extreme positions of the control knob 4.

In use of the control mechanism shown in FIG. 1 to control the supply of gas and electricity to apparatus such as an absorption refrigerator, the pairs of switch contacts 5 are connected to suitable A.C. and D.C. supplies and the gas tap 2 connected to the supply of gas. When the control knob 4 is in the "off" position, the cylindrical peg 14 on the arm 8 occupies an intermediate position 17 along the track 10 in which the gas tap 2 is closed and all the pairs of switch contacts 5 are unoperated. The supplies of gas and electricity are therefore disconnected from the apparatus. If the control knob 4 is rotated in an anti-clockwise direction as seen from the front in FIG. 1, the shaft 1 rotates so that the pairs of switch contacts 5 are operated by the cams (not shown) to supply electricity to the apparatus. At the same time the peg 14 rides smoothly along the semi-circular part 18 of the track 10, which approximates in snape to the upper portion of an interrogation mark, and torque is not applied to the plug 6 of the gas tap 2 which therefore remains closed.

If now the supply of electricity to the apparatus is to be disconnected and a supply of gas substituted, the control knob 4 is rotated in a clockwise direction as seen from the front, until it reaches the "off" position. During the consequential rotational movement of the shaft 1 the pairs of switch contacts 5 are returned to the unoperated position and the gas tap 2 remains closed, since the peg 14 rides smoothly back along the semicircular part 18 of the track 10. The control knob 4 is then rotated in the clockwise direction beyond the "off" position, so that the peg 14 moves along the part 19 of the track 10 which approximates to the stem of an interrogation mark. This movement of the peg 14 along the part 19 of the track 10 causes the peg 14 to engage the walls 11 and rotates the arm 8 about the shaft 12 so that the gas tap 2 is turned from the closed to the open position. Gas is therefore supplied to the apparatus. When the supply of gas is to be discontinued the control knob 4 is moved back to the "off" position causing the peg 14 to move along the part 19 of the track 10 in the reverse direction and close the gas tap 2.

Referring now to FIGS. 2 and 3 the control system of the absorption refrigerator includes a control mechanism as shown in FIG. 1 arranged to control the supply of gas from a gas inlet 20 to a gas burner 21. An electric igniter head 22 operated from a dry battery 23 by means of an ignition button 24 is arranged to ignite the gas burner 21. The ignition button 24 is mechanically coupled to a control valve 25 by a yoke 26 so that the ignition button 24 and control valve 25 are operated simultaneously. The control valve 25 is arranged to be held open, so that gas can be supplied to the gas burner 21, by means of an electromagnet (not shown) which is energised by an electric current generated by a thermo-couple device 27 when the gas burner 21 is burning. The supply of gas to the gas burner 21 is also controlled by a thermostat 28 which operates in accordance with the temperature in the cabinet of the refrigerator. A further thermostat 29 which also operates in accordance with the temperature in the cabinet of the refrigerator, is arranged to control the energisation of an electric heater for the refrigerator. The two thermostats 28 and 29 are coupled together by gears 30 and 31 so that they can be set by a common control knob 32. The front surface of a casing 33 surrounding the control knob 32 is calibrated to indicate a series of angular positions to which the control knob can be set to adjust the temperature of the refrigerator cabinet. The front surface of the casing 33 surrounding the control knob 4 is calibrated to indicate angular positions of the control knob which correspond to operated and unoperated positions of the pairs of switch contacts 5 and to the closed and open positions of the gas tap 2. A window 34 in the casing 33 gives a view of the gas burner 21 so that it can be inspected to ascertain if it is burning.

In use of the control system to control the supply of gas and electricity to an absorption refrigerator, the control knob 32 is first set to a position approximating to a desired temperature of the refrigerator cabinet. Assuming that the refrigerator is to be operated from an electricity supply, the control knob 4 is rotated in an anti-clockwise direction from the "off" position shown in FIG. 3, to the required voltage setting, so that the pairs of contacts 5 of the electric switch 3 are operated to supply electricity to an electric heater of the refrigerator. The supply of electricity to the electric heater is controlled by the thermostat 29 to maintain the temperature of the interior of the refrigerator cabinet in accordance with the setting of the control knob 32.

If now the supply of electricity to the electric heater is to be discontinued and the gas burner 21 supplied with gas, the control knob 4 is rotated in a clockwise direction as shown in FIG. 3, to the "off" so that the pairs of switch contacts 5 are returned to the unoperated position. The control knob 4 is then rotated in a clockwise direction beyond the "off" position so that the gas tap 2 is opened. Gas is not, however, supplied to the gas burner 21 because the control valve 25 remains closed. The ignition button 24 is now pressed so that the control valve 25 is opened by the yoke 26 to allow gas to pass to the gas burner 21. The yoke 26 also energises the igniter head 22 from the dry battery 23 so that the gas burner 21 is ignited. The ignition button 24 is kept depressed until the gas burner 21 has had time to heat the thermo-couple device 27 so that it generates an electric current and energises an electromagnet (not shown) which holds the control valve 25 in the open position. The ignition button 24 can then be released, thus releasing the yoke 26 and de-energising the igniter head and leaving the control valve 25 open. The supply of gas to the gas burner 21 is controlled by the thermostat 28 to maintain the temperature of the interior of the refrigerator cabinet in accordance with the setting of the control knob 32. The gas burner 21 can be viewed through the window 34 to ensure that it is burning.

Figure 4:
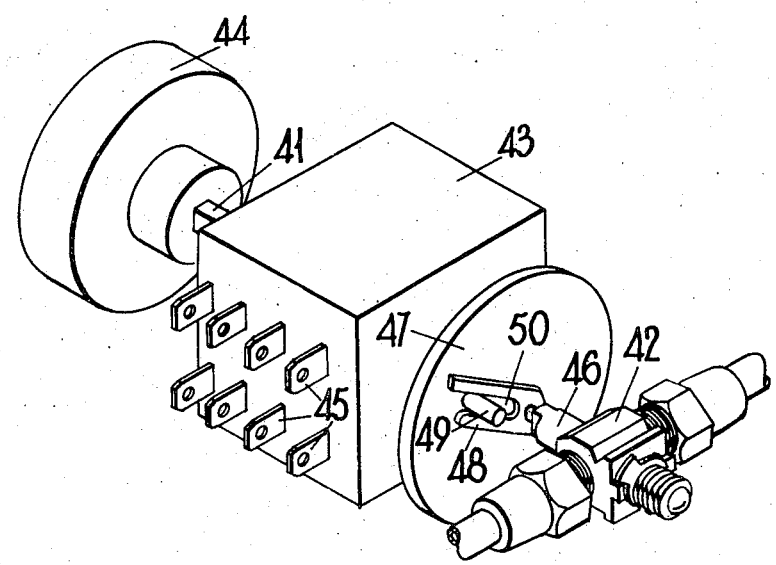
FIG. 4 is a rear perspective view of another control mechanism in accordance with the invention.

Referring now to FIG. 4, the control mechanism comprises a rotatably mounted shaft 41 which is arranged to operate a tapered plug gas tap 42 and an electric switch 43 when manually rotated by a control knob 44. The electric switch 43 has a plurality of pairs of contacts 45 arranged to be operated by suitable cams (not shown) on rotation of the shaft 41 by the control knob 44 in a manner similar to the contacts 5 of the switch 3. When the control mechanism is used in conjunction with an electric heater of an absorption type refrigerator, the pairs of switch contacts 45 are utilized to selectively energise the electric heater from a mains A.C. supply, or from a low voltage D.C. supply such as a car battery. The control knob 44 is suitably calibrated to indicate angular positions of the shaft 41 which correspond to operated and unoperated positions of the pairs of switch contacts 45.

The gas tap 42, which is of the kind requiring a 90° rotation of a plug 46 to turn it from a closed position to a fully open position, is coupled to the shaft 41 by a coupling comprising a circular plate 47 and a bifurcated arm 48. The plate 47 is rotationally fast with the shaft 41 and is provided with an axially extending pin 49 which rides within the radially extending slot 50 in the bifurcated arm 48. The bifurcated arm 48 is rotationally fast with the plug 46 and extends radially therefrom. The control knob 44 is also suitably calibrated to indicate angular positions of the shaft 41 which correspond to the closed and open positions of the gas tap 42, the closed position of the gas tap 42 and the position of the electric switch 43 in which all the pairs of contacts 45 are unoperated being a common "off" position intermediate the extreme positions of the control knob 44.

In use of the control mechanism shown in FIG. 4 to control the supply of gas and electricity to apparatus such as an absorption refrigerator, the pairs of switch contacts 45 are connected to suitable A.C. and D.C. supplies and the gas tap 42 connected to a supply of gas. When the control knob 44 is in the "off" position the axially extending pin 49 is just clear of the slot 50 in the bifurcated arm 48 and the supplies of gas and electricity are disconnected from the apparatus. If the control knob 44 is rotated in a clockwise direction as seen from the front in FIG. 4, the shaft 41 rotates so that the pairs of switch contacts 45 are operated to supply electricity to the apparatus. Rotation of the shaft 41 also rotates the pin 47 so that the pin 49 moves away from the slot 50 and therefore the bifurcated arm 48 remains stationary and the gas tap 42 remains closed.

If now the supply of electricity is to be disconnected and a supply of gas substatuted, the control knob 44 is rotated in an anti-clockwise direction as seen from the front, until it reaches the "off" position. During the consequential rotational movement of the shaft 41 the pairs of switch contacts 45 are returned to the unoperated position and the plate 47 is rotated to a position in which the pin 49 is just clear of the slot 50. The control knob 44 is then rotated in the anti-clockwise direction beyond the "off" position so that the pin 49 enters the slot 50 and rides down the slot, moving the arm 48 and applying torque to the plug 46 so that the gas tap 42 is turned from the closed to the open position. Gas is therefore supplied to the apparatus. When the supply of gas is to be discontinued the control knob 44 is moved back to the "off" position, rotating the plate 47 so that the pin 49 rides up the slot 50, moving the arm 48 and applying torque to the plug 46 so that the gas tap 42 is turned from the open to the closed position.

The control mechanism described with reference to FIG. 4 may be incorporated in the control system of an absorption refrigerator similar to that described with reference to FIGS. 2 and 3.

I claim:

1. A control mechanism for apparatus energized by gas or electricity comprising:
   a. valve means for controlling a supply of gas;
   b. switching means for controlling a supply of electricity;
   c. a selector common to both the valve means and switching means and having an "off" position in which both the valve means and switching means are prevented from supplying gas and electricity respectively;
   d. cam means rotatable by the selector for actuating said switching means; and
   e. coupling means comprising a first part rotatable by the selector, and a second part for actuating said valve means, one of said parts providing a guide path, and the other of said parts carrying a member rideable along said path on actuation of the selector, said path being shaped and arranged to move the valve means between open and closed positions while the switch means controlling the supply of electricity is unactuated, and to leave the valve means closed while the switching means is actuated.

2. A control mechanism as claimed in claim 1, wherein the guide path is provided by said first part of the coupling means and the said member which is rideable along said guide path is carried by said second part.

3. A control mechanism as claimed in claim 1 wherein the guide path is provided by said second part of the coupling means and the said member which is rideable along said guide path is carried by said first part.

4. A control mechanism as claimed in claim 2 wherein the first part of the coupling means is provided with a guide path in the form of an eccentric track approximating in shape to an interrogation mark, and the second part of the coupling means is fixed to a rotatable shaft which actuates the valve means, said second part carrying an axially extending member which is offset from the axis of the shaft and which rides along said track.

5. A control mechanism as claimed in claim 3 wherein the second part of the coupling means is fixed to a rotatable shaft which actuates the valve means and is provided with a guide path in the form of a radially extending slot, the shaft being parallel to but offset from the axis of rotation of the first part of the coupling means, and the first part of the coupling means carrying an axially extending member which is offset from the axis of rotation of said part and which rides along said slot.

6. A control mechanism as claimed in claim 1 wherein the valve means comprises a gas tap of the kind which requires a movement of substantially 90° to turn it from a closed position to a fully open position 7. A control mechanism as claimed in claim 1 incorporated in an absorption refrigerator separately energizable by a gas burner and an electric heater, and having separate thermostats provided for the gas burner and the electric heater coupled together by gearing to enable them to be set by a common control knob.

8. A control mechanism as claimed in claim 7 having a control valve operable manually to permit gas to be supplied to the burner when the valve means is open, an electromagnet energizable to hold the control valve open, and means for supplying energizing current to the electromagnet when the burner is alight.

9. A control mechanism as claimed in claim 8, wherein an electric igniter head operated by an ignition button is arranged to ignite the gas burner.

10. A control mechanism as claimed in claim 9, wherein the control valve is coupled to the ignition button so that the control valve is opened when the ignition button is operated.

11. A control mechanism as claimed in claim 10, including a window through which the gas burner can be viewed to ensure that the gas is burning.

* * * * *